& # x20;

(12) United States Patent  
Soetemans et al.

(10) Patent No.: US 7,710,866 B2
(45) Date of Patent: May 4, 2010

(54) METHOD AND APPARATUS FOR OPTIMIZATION OF REDUNDANT LINK USAGE IN A MULTI-SHELF NETWORK ELEMENT

(75) Inventors: Joseph Soetemans, Nepean (CA); Dion Pike, Dunrobin (CA); Larry Friesen, Nepean (CA); Jean Labonte, Aylmer (CA)

(73) Assignee: Alcatel-Lucent Canada Inc., Kanata, ON (CA)

( * ) Notice: Subject to any disclaimer, the term of this patent is extended or adjusted under 35 U.S.C. 154(b) by 2074 days.

(21) Appl. No.: 10/152,857

(22) Filed: May 22, 2002

(65) Prior Publication Data
US 2003/0058791 A1 Mar. 27, 2003

Related U.S. Application Data

(60) Provisional application No. 60/325,368, filed on Sep. 27, 2001.

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl. ............... 370/225; 370/218; 370/400; 370/458; 709/220

(58) Field of Classification Search ......... 370/216–230, 370/241–252, 360–395, 463–469, 370/386, 370/400–535; 709/220–229, 237–245; 714/4–20
See application file for complete search history.

(56) References Cited

U.S. PATENT DOCUMENTS 5,130,974 A * 7/1992 Kawamura et al. .......... 370/217

(Continued)

FOREIGN PATENT DOCUMENTS

CA 2273525 5/2000

(Continued)

OTHER PUBLICATIONS

Srinivas Makam, et al.; Framework for MPLS-based Recovery:Jul. 2000; pp. 1-34; internet draft.

(Continued)

*Primary Examiner*—Man Phan
(74) *Attorney, Agent, or Firm*—Ross D. Snyder & Associates, Inc.

(57) ABSTRACT

A method and apparatus for optimizing redundant link usage allows a portion of the wasted bandwidth in a redundant link system to be utilized for additional data traffic without compromising the ability of the system to respond to and correct for a failure of a link. In one embodiment, one of two independent, individually addressable links is selected as a nominal communication path, and the other as a standby communication path. The path independent traffic is sent via the nominal communication path, while the path dependent data is sent via the nominal communication path or the standby path, in accordance with the dependence of the traffic. In another embodiment, critical time sensitive traffic is sent via a nominal and standby time sensitive paths, while normal traffic is sent via nominal normal path, and non-critical traffic is sent via a standby normal path.

41 Claims, 8 Drawing Sheets

U.S. PATENT DOCUMENTS

| | | | |
|---|---|---|---|
| 5,210,680 A | 5/1993 | Scheibler | |
| 5,229,925 A | 7/1993 | Spencer et al. | |
| 5,237,484 A | 8/1993 | Ferchau et al. | |
| 5,276,893 A * | 1/1994 | Savaria | 714/10 |
| 5,410,536 A * | 4/1995 | Shah et al. | 370/216 |
| 5,497,363 A | 3/1996 | Gingell | |
| 5,550,802 A * | 8/1996 | Worsley et al. | 370/252 |
| 5,574,718 A * | 11/1996 | Eckhoff et al. | 370/228 |
| 5,687,063 A | 11/1997 | Chabert | |
| 5,822,184 A | 10/1998 | Rabinovitz | |
| 6,289,043 B1 * | 9/2001 | Kumata | 375/220 |
| 6,490,289 B1 * | 12/2002 | Zhang et al. | 370/401 |
| 6,501,768 B2 | 12/2002 | Marin et al. | |
| 6,542,934 B1 * | 4/2003 | Bader et al. | 709/239 |
| 6,591,374 B1 * | 7/2003 | Christensen et al. | 714/14 |
| 6,704,302 B2 * | 3/2004 | Einbinder et al. | 370/352 |
| 6,724,757 B1 * | 4/2004 | Zadikian et al. | 370/388 |
| 6,738,818 B1 * | 5/2004 | Shah | 709/228 |
| 6,760,339 B1 * | 7/2004 | Noel et al. | 370/401 |
| 6,768,745 B1 | 7/2004 | Gorshe et al. | |
| 6,816,590 B2 | 11/2004 | Pike et al. | |
| 6,823,470 B2 * | 11/2004 | Smith et al. | 714/4 |
| 6,839,361 B2 | 1/2005 | Marin et al. | |
| 6,850,704 B1 * | 2/2005 | Dave | 398/2 |
| 6,861,943 B2 | 3/2005 | Pike et al. | |
| 6,973,229 B1 | 12/2005 | Tzathas et al. | |
| 7,085,225 B2 * | 8/2006 | Schaller et al. | 370/217 |
| 7,095,735 B2 * | 8/2006 | Pike et al. | 370/360 |
| 7,099,271 B2 * | 8/2006 | Friesen et al. | 370/218 |
| 7,099,979 B2 | 8/2006 | Soetemans et al. | |
| 7,209,477 B2 * | 4/2007 | Pike | 370/360 |
| 7,233,568 B2 * | 6/2007 | Goodman et al. | 370/218 |
| 7,289,436 B2 * | 10/2007 | Schaller et al. | 370/225 |
| 2002/0044525 A1 | 4/2002 | Czerwiec et al. | |
| 2002/0059424 A1 * | 5/2002 | Ferguson et al. | 709/226 |
| 2002/0099972 A1 * | 7/2002 | Walsh et al. | 714/10 |
| 2003/0058618 A1 * | 3/2003 | Soetemans et al. | 361/688 |
| 2003/0058800 A1 * | 3/2003 | Goodman et al. | 370/241 |
| 2003/0061313 A1 * | 3/2003 | Soetemans | 709/220 |
| 2003/0137934 A1 * | 7/2003 | Schaller et al. | 370/227 |
| 2006/0274736 A1 * | 12/2006 | Pike et al. | 370/360 |

FOREIGN PATENT DOCUMENTS

| | | |
|---|---|---|
| FR | 2273525 | 5/2000 |
| WO | WO01/61906 | 8/2001 |
| WO | WO 01/61909 A1 | 8/2001 |

OTHER PUBLICATIONS

IEFE, Framework for MPLS-Based Recovery, INET, [Online] Jan. 2001, XP-002266404.

Li, M.J., et al., Two-Fiber Optical Channel Shared Protection Ring . . . , Optical Fiber Communication Conference, Technical Digest Postconf, Anahein, CA, Mar. 17-22, 2001 . . . .

Itu, "Types & Characteristics of SDH Network Protection Architectures", Oct. 1998, XP-002275277.

Itu, "Architecture of Optical Transport Networks", Mar. 1999, XP-002224175.

Wolf-Dieter Haab, "Handbuch der Kommunikationsnetze", 1997, Springer, XP002275279.

IBM, "Clock Distribution Algorithm for Synchronization Network", IBM Technical Disclosure Bulletin, Jan. 1990, XP-000082683, New York, USA.

Itu, "Definitions and Terminology for Synchronization Networks", Aug. 1996, XP-002275278.

* cited by examiner

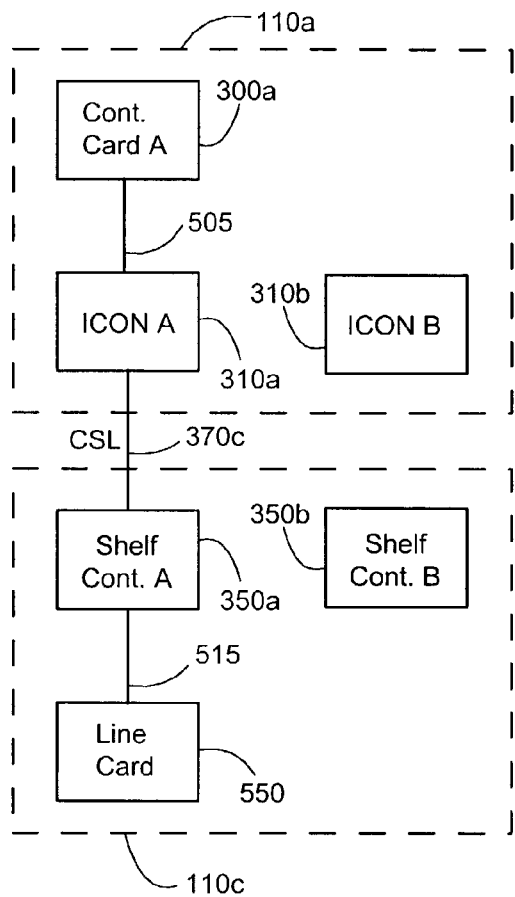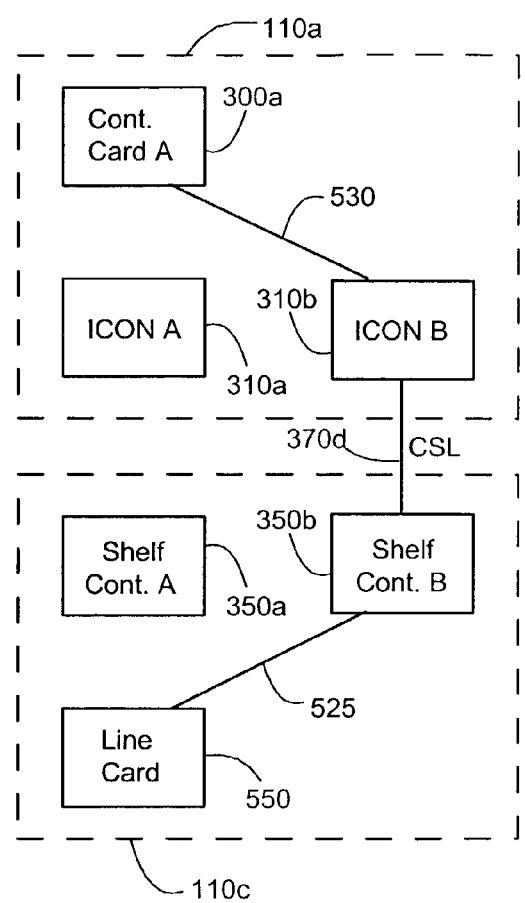
Figure 5A                    Figure 5B

US 7,710,866 B2

METHOD AND APPARATUS FOR OPTIMIZATION OF REDUNDANT LINK USAGE IN A MULTI-SHELF NETWORK ELEMENT

RELATED APPLICATIONS

This application claims the benefit of U.S. Provisional Application No. 60/325,368, filed Sep. 27, 2001.

FIELD OF THE INVENTION

The present invention relates to the field of network elements, and more particularly to a method and apparatus for optimization of redundant link usage in a multi-shelf network element.

BACKGROUND OF THE INVENTION

1. Multi-Shelf Network Elements

An example of a multi-shelf network element with which the present invention may be used is multi-shelf switch system 100 shown in schematic block form in FIG. 1. Switch system 100 comprises peripheral shelves 110a-n, switching shelves 120a-b, and control complex 130. Peripheral shelves 110a-n provide input/output (I/O) interfaces for connection to data paths 115a-n for which switching services are provided by switch system 100. Switching shelves 120a-b provide the switching services for the system. Control complex 130 provides central management for the switch system. The various shelves of switch system 100 are interconnected by intershelf links 140a-h and 150a-f. An example embodiment of the switch system 100 of FIG. 1 is the Alcatel 7670 Router Switch Platform (RSP) Multi-Shelf system (Alcatel 7670). The Alcatel 7670 is a multiprotocol backbone system designed to switch ATM cells and route IP traffic through the same switching fabric. Depending on its configuration, the Alcatel 7670 provides from 14.4 Gbps up to 450 Gbps of switching capacity.

In one embodiment of switch system 100 of FIG. 1, each of switching shelves 120a-b contains a switching fabric core and up to 32 switch access cards (SAC), each providing 14.4 Gbps of cell throughput to and from the core. Switching shelves 120a-b are configured as a redundant pair and are referred to as switching shelf X and switching shelf Y.

In one embodiment, two types of peripheral shelves 110a-n may be used in switching system 100. The first type, called a high speed peripheral shelf (HSPS), comprises high speed line processing cards (HLPC) each providing 10 Gbps throughput, high speed I/O cards (HIOC), high speed fabric interface cards (HFIC) and two high speed shelf controllers (HSC). The second type, called simply a peripheral shelf (PS), comprises lower speed line processing cards (LPC) each providing 2.5 Gbps throughput, I/O Cards (IOC) and dual or quad port fabric interface cards (DFIC/QFIC). Each of peripheral shelves 110a-n also typically includes a shelf control system which may comprise control complex 130 (in the case of peripheral shelf 110a) or one or preferably two redundant peripheral shelf controllers (PSC).

In one embodiment, switching shelves 120a-b connect to the peripheral shelves 110a-n in the system via fabric interface cards (FIC) to provide cell switching to the line processing cards (also referred to as "line cards") in the peripheral shelves. Examples of these connections are illustrated in FIG. 2.

FIG. 2 includes two switching shelves 120a (designated "switching shelf X") and 120b (designated "switching shelf Y") and three peripheral shelves: two normal speed peripheral shelves 110a (designated "PS1") and 110b (designated "PS2") and one high speed peripheral shelf 110c (designated "HSPS3"). In one embodiment, each of the peripheral shelves may comprise up to sixteen (16) line processing cards. In FIG. 2, two line cards 225a-b are shown for peripheral shelf 110a, four line cards 235a-d for peripheral shelf 110b, and four high speed line cards 245a-d for high speed peripheral Shelf 110c. Each pair of line cards in each peripheral shelf communicate with an associated pair of I/O cards, which connect to the data stream for which switching services are being provided. Thus, in the embodiment of FIG. 2, line cards 225a-b communicate with associated I/O cards 220a-b, line cards 235a-b communicate with I/O cards 230a-b, line cards 235c-d communicate with I/O cards 230c-d, high speed line cards 245a-b communicate with I/O cards 240a-b, and high speed line cards 245c-d communicate with I/O cards 240c-d. Each line card is also connected to two redundant fabric interface cards (FIC) which provide high speed connections between each line card and each switching shelf 120a and 120b. One of each pair of FIC's is designated FIC "X" and the other is designated FIC "Y". Three types of FIC's are shown in FIG. 2. Peripheral shelf 110a contains two dual FIC's (DFIC) 270a and 270b. Peripheral shelf 110b contains two quad FIC's (QFIC) 275a-b, and high speed peripheral shelf 110c contains four high speed FIC's (HFIC) 280a-d.

In one embodiment, each switching shelf 120a-b comprises a switch core and up to 32 switching access cards (SAC). In the embodiment of FIG. 2, switching shelf X 120a comprises switch core 250a and SAC's 255a-h, and switching shelf Y 120b comprises switch core 250b and SAC's 265a-h.

In one embodiment, the connections between the various components within a shelf are provided via one or more circuit boards in each shelf, referred to as "midplanes," to which the respective components are mounted.

In the embodiment of FIG. 2, each "X"-designated FIC on a peripheral shelf is connected to one or more SAC's on switching shelf X 120a, and each "Y"-designated FIC on a peripheral shelf is connected to one or more SAC's on switching shelf Y 120b. A DFIC connects to up to two SAC's, a QFIC to up to four SAC's, and a HFIC to a single SAC. In the embodiment of FIG. 2, the connection between the FIC's on a peripheral shelves 110a-c and the SAC's on switching shelves 120a-b is via high speed intershelf links (HISL) 290a-p, which carry the cell-switched data path traffic. Thus DFIC X 270a of peripheral shelf 110a is connected to SAC's 255a-b on switching shelf X 120a via HISL's 290a-b, and DFIC Y 270b of peripheral shelf 110a is connected to SAC's 265a-b on switching shelf Y 120b via HISL's 290i-j. Similarly, on peripheral shelf 110b, QFIC X 275a is connected to SAC's 255c-f on switching shelf X 120a via HISL's 290c-f, and QFIC Y 275b is connected to SAC's 265c-f on switching shelf Y 120b via HISL's 290k-n. Finally, on high speed peripheral shelf 110c, HFIC's X 280a and 280c are connected via HISL's 290g-h to SAC's 255g-h on switching shelf X 120a, and HFIC's Y 280b and 280d are connected via HISL's 290o-p to SAC's 265g-h on switching shelf Y 120b, respectively.

The switch cores 250a-b, SAC's 255a-h and 265a-h, HISL's 290a-p, and FIC's 270a-b, 275a-b and 280a-d comprise the system's "switching fabric."

In the switch system of FIGS. 1 and 2, peripheral shelf 110a, designated "Peripheral Shelf 1," contains control complex 130. In one embodiment, control complex 130 comprises a logical grouping of cards that provide the central management for all features of switch system 100. The local and remote user interfaces to the system are provided by control complex 130 via user terminals 160 and 170. In addition, control complex 130 maintains a database for all cards on the system. One embodiment of control complex 130 is illustrated in FIG. 3.

In the embodiment of FIG. 3, control complex 130 comprises two control cards 300a-b (designated "Control Card A" and "Control Card B", respectively), two intershelf connection (ICON) cards 310a-b, two control interconnect (CIC) cards 315a-b, two intershelf connection I/O (ICON I/O) cards 320a-b, and two intershelf connection I/O expansion cards (ICON I/O Exp) 330a-b. Control complex 130 also comprises a facility card (FAC) that provides an RS232 management port and two timing ports that can be attached to a timing source for system synchronization. In addition to control complex 130, peripheral shelf 110a also comprises its own set of line processing cards 340 that communicate with control complex 130 via CIC cards 315a-b.

Control complex 130 communicates with each shelf in the switch system via shelf controllers on the peripheral and switching shelves. In the embodiment of FIG. 3, peripheral shelf 110b comprises a redundant pair of shelf controllers 340a-b, high speed peripheral shelf 110c comprises a redundant pair of high speed shelf controllers 350a-b, and switching shelves 120a and 120b each comprise a switching shelf controller 360a and 360b, respectively.

ICON I/O cards 320a-b and ICON I/O Exp cards 330a-b provide interfaces for connecting control complex 130 to other shelves (such as peripheral I/O and switching shelves) in the switch system via physical connections. In one embodiment, these connections are referred to as Control Services Links (CSL) 370a-h. In the embodiment of FIG. 3, each ICON I/O and ICON I/O Exp card contains eight CSL ports. ICON I/O A 320a and ICON I/O B 320b provide ports for CSL connections to the two switching shelves X and Y 120a-b and to the first six peripheral I/O shelves (designated peripheral shelves 2 to 7), while ICON I/O Exp A 330a and ICON I/O Exp B 330b provide ports for CSL connections to eight additional peripheral I/O shelves (designated peripheral shelves 8 to 15). ICON cards 310, ICON I/O cards 320, ICON I/O Exp cards 330, CSL's 370, and shelf controllers 340, 350 and 360 provide an intershelf connection (ICON) infrastructure that allows the transfer of control traffic between control complex 130 and the controllers and cards in peripheral shelves 110 and switching shelves 120 without using any bandwidth on the main data path. Data path traffic goes through the switching fabric shown in FIG. 2 whereas the control traffic uses the out of band ICON infrastructure (also sometimes referred to as the "control infrastructure") of FIG. 3 to transfer data. Operation of the control infrastructure is not affected by the switching fabric, and the switching fabric is not affected by the control infrastructure.

In one embodiment, a CSL link is physically embodied in a twelve-conductor cable comprising three separate, internal 4-conductor Cat-5-type cables. Each 4-conductor internal cable provides one of three different types of communications channels: a time division multiplexed (TDM) channel (providing E1-type capabilities), a full duplex (Ethernet) messaging channel, and a simplex differential channel.

The TDM channel (also sometimes referred to as the "E1 channel") is used by the ICON infrastructure to transport time sensitive transport activity, shelf numbering control and system timing information throughout the system. In one embodiment, the TDM channel operates at a frequency of 8000 Hz, providing 32 time slots with 8-bits per slot at a 125 microsecond refresh rate resulting in a data rate of 2.048 Mbps. In this embodiment, the TDM channel provides a guaranteed point-to-point channel between the ICON cards on peripheral shelf 1 and any shelf connected to one of peripheral shelf 1's CSL ports.

The full duplex messaging channel (also sometimes referred to as the "Ethernet channel") is used for general communications with any shelf in the system. In one embodiment, the Ethernet channel operates at 100 Mbps. Each Ethernet link to a shelf is shared among all components (cards) within the shelf. As a result, every element in the system is capable of communicating with the control complex via the Ethernet channel.

The Ethernet channel may be used for a large variety of communications, including connection information, software downloading to the individual components, debugging, alarm management, and configuration transfers. Communications between the control complex and the shelf controllers that does not travel over the TDM channel in general travels over the Ethernet channel.

The simplex differential channel (also sometimes referred to as the "RTS channel") is used to distribute a real time stamp (RTS) from the controller to each of the shelves in the system. The simplex differential channel is used instead of the TDM channel or the Ethernet channel because the RTS is sensitive to time delays that result from the applications running on the TDM and Ethernet channels. The RTS is used to align all elements of the system to the same time stamp for purposes such as debugging and billing. The RTS signal is generated by the control complex and is provided to the ICON cards via a direct circuit board (mid-plane) connection. The ICON cards are responsible for extracting the signal and transmitting it via the differential channel to all shelves in the system.

The use of redundant pairs of control cards and icon cards in peripheral shelf 1 and redundant shelf controllers in other peripheral I/O shelves creates redundant pathways over which control traffic can flow between each control card of the control complex in peripheral shelf 1 and each line card of each peripheral I/O shelf. Examples of redundant pathways between control card 300a and a line card 550 of high speed peripheral shelf 110c are shown in FIGS. 5a-b. For simplicity, only the main relevant components are shown in FIGS. 5a-b. For the same reason, the ICON I/O and ICON I/O Exp cards are not shown separately but are included as part of the respective ICON cards.

A first pathway, shown in FIG. 5a, comprises midplane link 505 between control card A 330a and ICON card A 310c in peripheral shelf 1 110a, CSL link 370c between ICON card A 310c on peripheral shelf 1 110a and shelf controller A 350a on peripheral shelf 2 110c, and midplane link 515 between shelf controller A 350a and line card 550 on peripheral shelf 2 110c. A second pathway, shown in FIG. 5b, comprises midplane link 530 between control card A 330a and ICON card B 310b on peripheral shelf 1 110a, CSL link 370d between ICON card B 310b on peripheral shelf 1 110a and shelf controller B 350b on peripheral shelf 2 110c, and midplane link 525 between shelf controller B 350b and line card 550 on peripheral shelf 2 110c.

FIG. 4 illustrates the control traffic flow of the pathway of FIG. 5a. In the embodiment of FIG. 4, controller card a 300a comprises a microprocessor 405, a real time stamp source 415, and an Ethernet port 410.

Microprocessor 405 exchanges time sensitive control data and normal control data with line card 420 on peripheral shelf 2 110c. Time sensitive control data travels over a set of "n" direct links 420 to a field programmable gate array (FPGA) 450 on ICON card A 310a. FPGA 450 assembles the data for transmission via TDM, and transmits the time sensitive data via E1 channel 485 of CSL 370c to FPGA 470 of shelf controller A 350a on peripheral shelf 2 110c. FPGA 470 extracts the time sensitive data for line card 420 from the TDM stream, and passes it via direct midplane links 495 to line card 420.

Normal control data, on the other hand, travels from microprocessor 405 to Ethernet port 410 of control card A 300a, and from there via midplane Ethernet link 425 to switch 445 of ICON card A 310a. Switch 445 passes the data via CSL Ethernet channel 490 to switch 465 on shelf controller A 350a of peripheral shelf 2 110c. Switch 465 in turn transmits the data to Ethernet port 482 on line card 420. A microprocessor 466 of shelf controller A 350a on peripheral shelf 2 110c is coupled to FPGA 470 via connection 467, switch 465 via connection 468, and Ethernet port 482 via connection 469, allowing microprocessor 466 access to the time sensitive data and the normal control data and/or allowing microprocessor 466 to exert control over the operations of FPGA 470, switch 465, and/or Ethernet port 482 (or, more generally, line card 420 via Ethernet port 482).

Real time stamp (RTS) source 415 may generate its own time signal, or may receive a time signal from an external source. RTS source 415 communicates its time signal via midplane link 430 to RTS transponder 455 on ICON card A 310a. RTS transponder 455 converts the time signal into proper form for transmission over the differential channel of CLS 370a and sends it to RTS transponder 475 on shelf controller A 350a of peripheral shelf 2 110c. RTS transponder 475 extracts the RTS signal from CSL 370c's RTS channel and distributes it to line card 420 via midplane link 497.

Even though FIG. 4 only shows the control data pathways between one control card and one ICON card, it will be understood that the same pathways exist between each control card and both of the ICON cards in peripheral shelf 1 110a.

2. APS Automatic Protection System

A common method used to prevent data communications interruptions is known as Automatic Protection Switching (APS) 1+1. In an APS 1+1 system, components are connected via redundant, mirrored links. Each transmitting component sends the identical data over both links, and each receiving component listens to both links. One of the links is the normal "work" link, while the other is the "protection" link. As long as the work link is operating properly, the receiving component processes the data received from that link and discards the data received via the protection link. However, if at any time the work link becomes inoperable or defective, the receiving component immediately begins processing the data received over the "protection" link. Both links must carry identical data so that no data loss occurs when such a switch is made.

APS is useful because it prevents communications failures resulting from a single link failure. However, it does so at the expense of bandwidth: because the same data is sent simultaneously over two separate links, the total bandwidth needed is twice the what is required by the data stream itself, even though the data transferred over the protection link is used only during the infrequent times when there is a failure of the work link, and is otherwise discarded.

SUMMARY OF THE INVENTION B1

The present invention comprises a method and apparatus for optimizing redundant link usage so as to allow a portion of the wasted bandwidth in a redundant link system to be utilized for additional data traffic without compromising the ability of the system to respond to and correct for a failure of a link. In one embodiment, two independent, individually addressable links are established between two endpoints. One of the links is selected as a nominal communication path, and the other as a standby communication path. Data traffic between the endpoints is divided into path independent traffic and path dependent traffic. The path independent traffic is sent via the nominal communication path, while the path dependent data is sent via the nominal communication path or the standby path, in accordance with the dependence of the traffic. In another embodiment, the nominal communication path and standby communication path each comprise a time sensitive path and a normal path. Critical time sensitive traffic is sent via the nominal and standby time sensitive paths, while normal traffic is sent via the nominal normal path, and non-critical traffic is sent via the standby normal path.

BRIEF DESCRIPTION OF THE DRAWINGS

FIGS. 5A and 5B show alternative redundant paths between two shelves of an embodiment of a multi-shelf network element.

DESCRIPTION OF THE PREFERRED EMBODIMENT

A method and apparatus for optimizing redundant link usage in a multi-shelf network element is disclosed. In the following description, numerous specific details are set forth to provide a thorough description of the invention. However, it will be apparent to one skilled in the art that the invention may be practiced without these specific details. In other instances, well-known features have not been described in detail so as not to obscure the invention.

Figure 1:
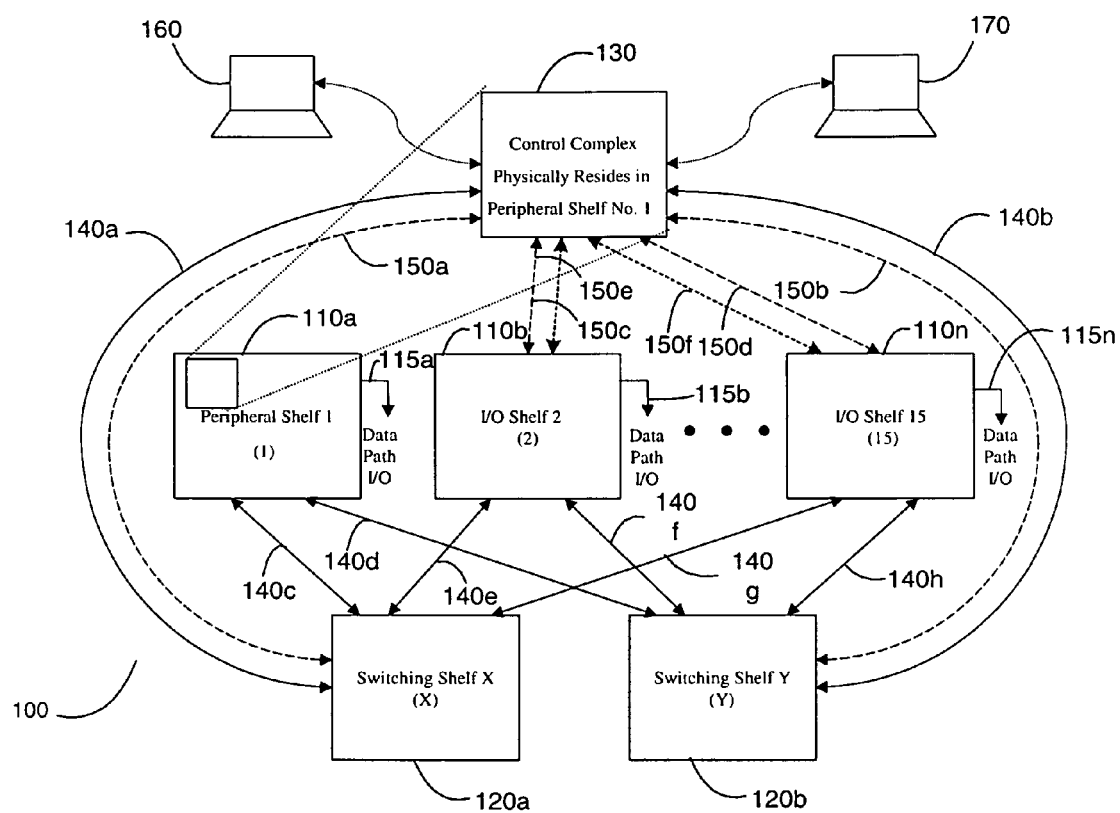
FIG. 1 shows an embodiment of a multi-shelf network element.
Figure 2:
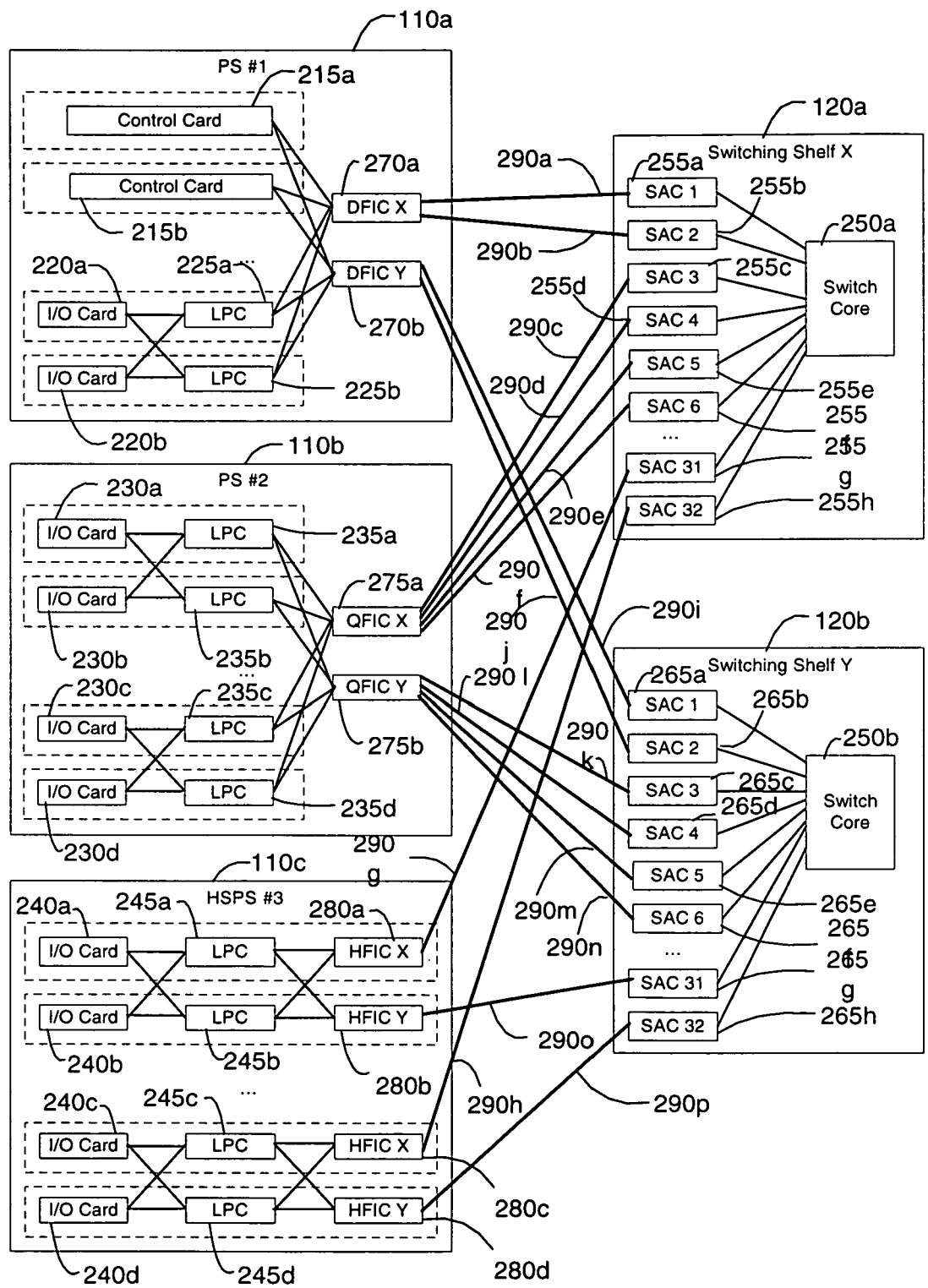
FIG. 2 shows a data path infrastructure of an embodiment of a multi-shelf network element.
Figure 3:
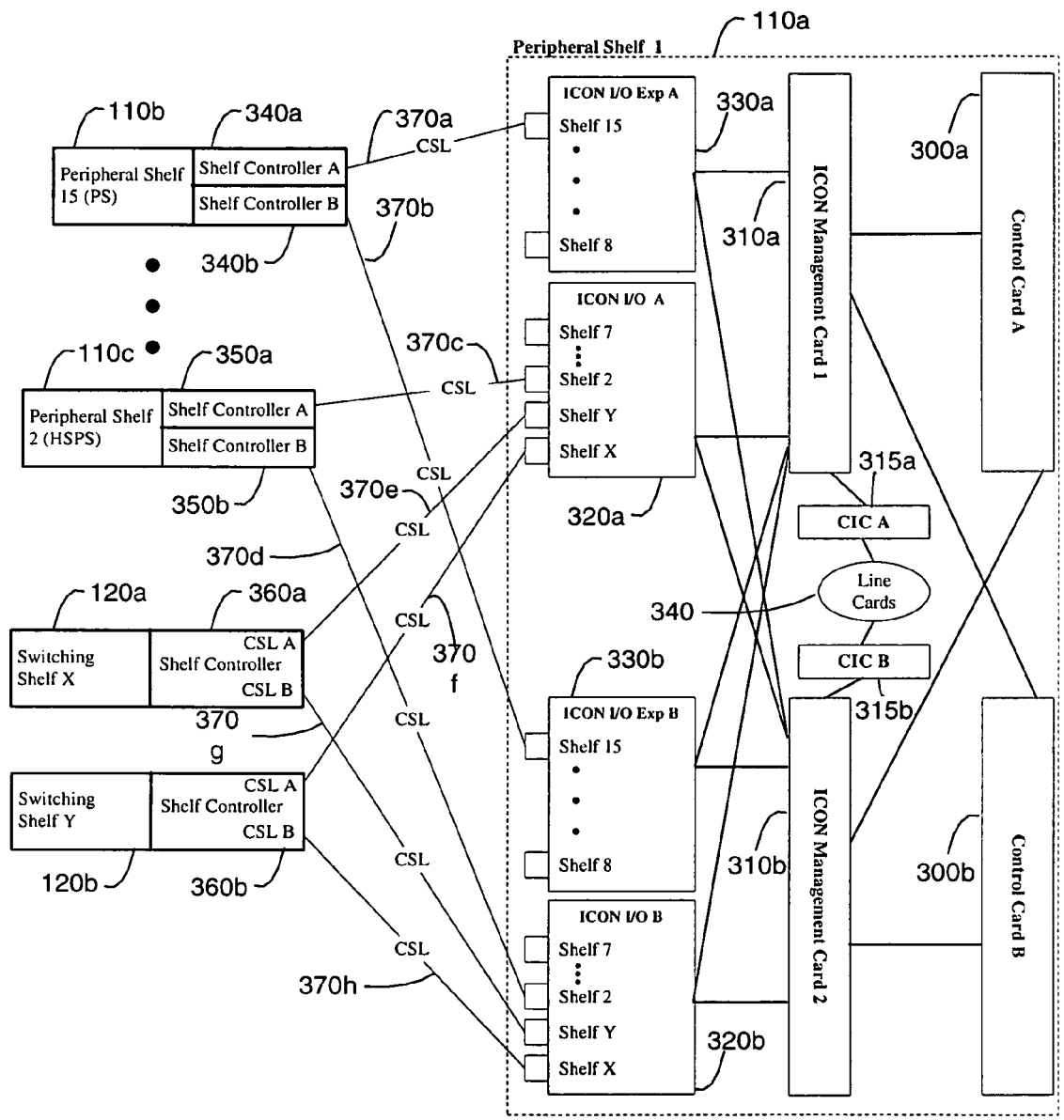
FIG. 3 shows a control data path infrastructure of an embodiment of a multi-shelf network element.
Figure 4:
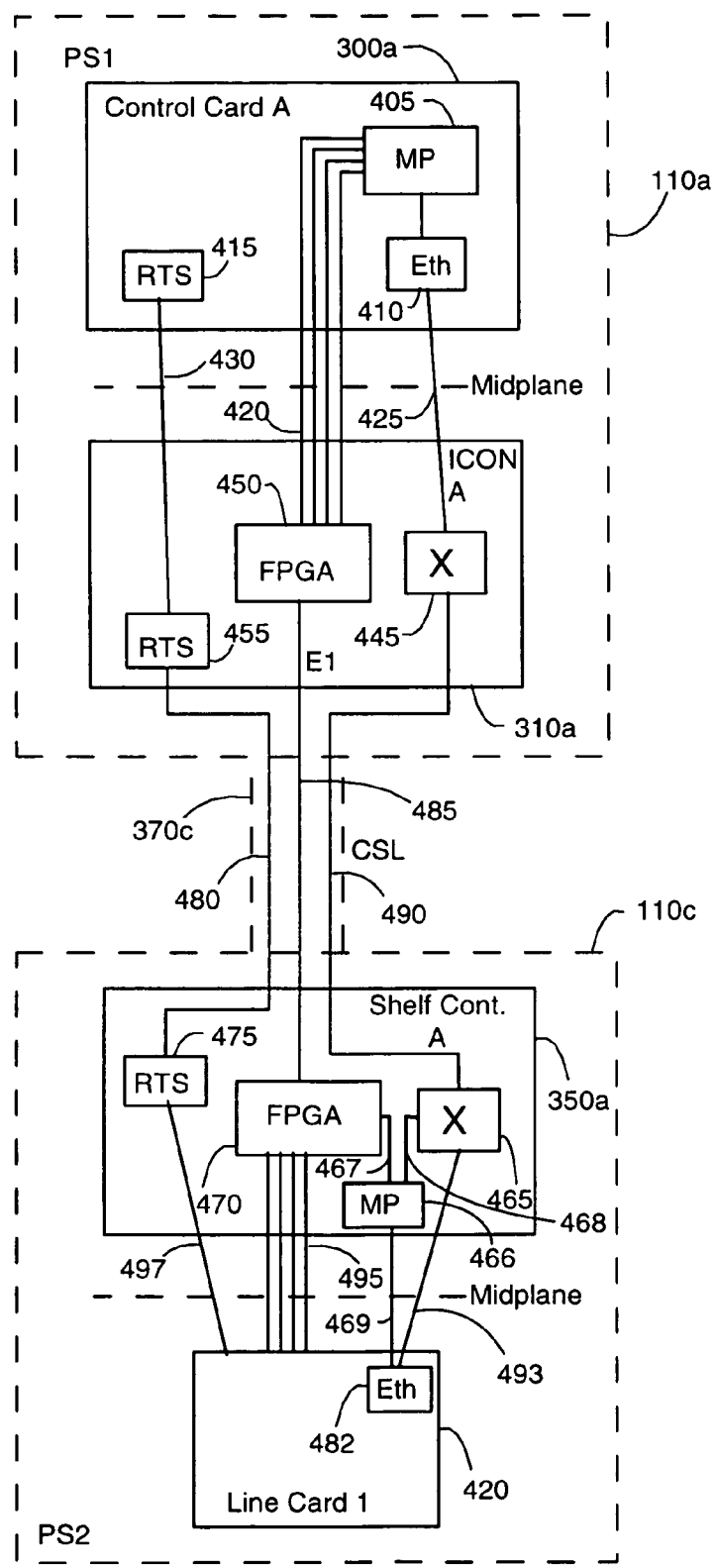
FIG. 4 shows intershelf control data paths between two shelves of an embodiment of a multi-shelf network element.

FIGS. 5A and 5B show intershelf control data path connections between two shelves of a multi-shelf element in an embodiment of the invention. FIG. 5A shows the control data path connections between control card A 300a in peripheral shelf 1 110a and shelf controller A 350a of peripheral I/O shelf 110c. These control data path connections are the same as those of FIG. 4, in simplified form. In addition, FIG. 5B shows a similar control data path between control card A 300a and shelf controller B 350b in peripheral I/O shelf 110c.

Figure 6:
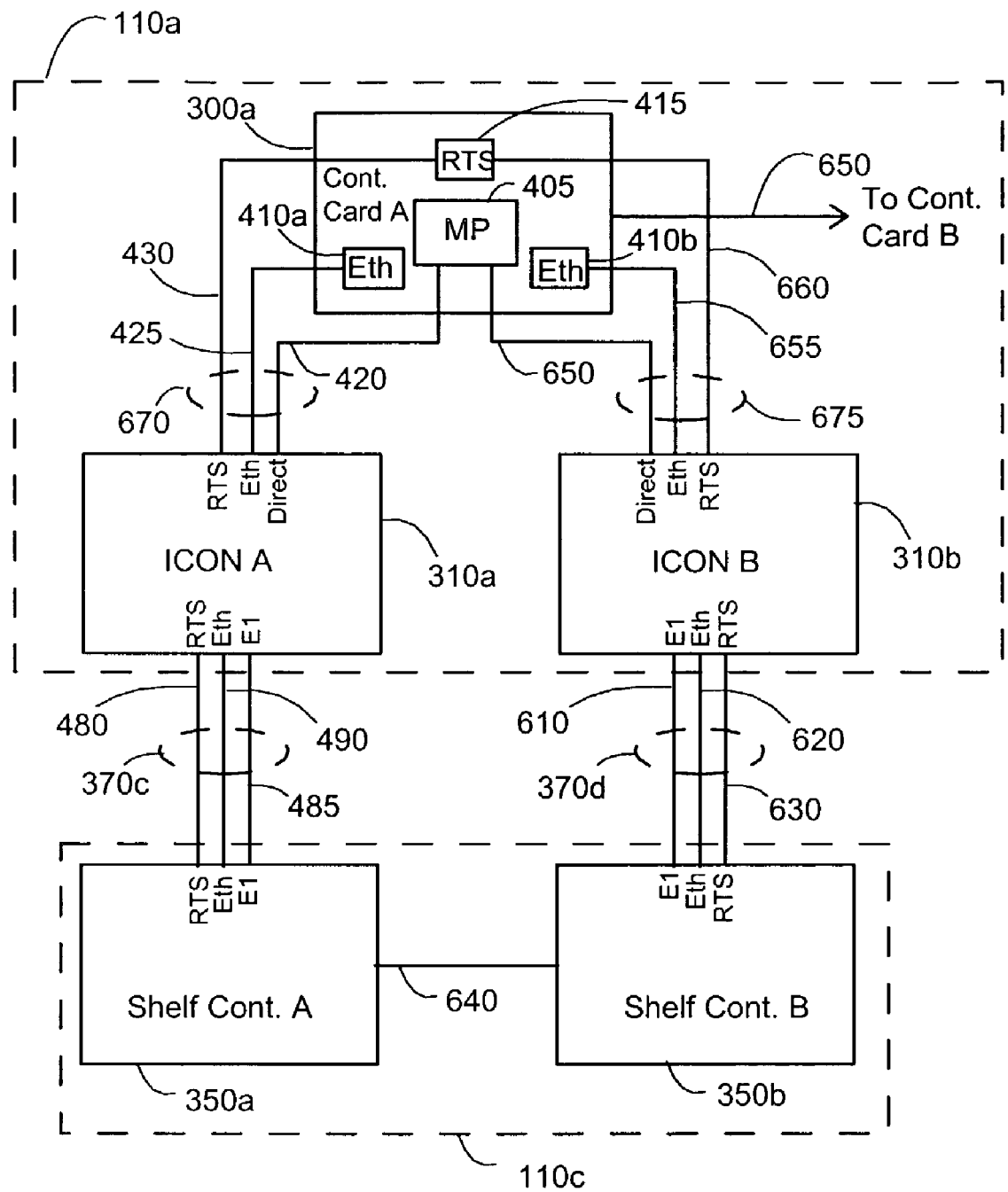
FIG. 6 shows intershelf control data path connections between two shelves of a multi-shelf element in an embodiment of the invention.

As shown in FIG. 6, the control data path between control card A 300a and shelf controller A 350a includes an intrashelf control data path 670 between control card A 300a and ICON card A 310a and an intershelf CSL link 370c between ICON card A 310a and shelf controller A 350a. Similarly, the control data path between control card A 300a and shelf controller B 350b includes intrashelf control data path 675 between control card A 300a and ICON card B 310b and intershelf CSL link 370d between ICON card B 310b and shelf controller B 350b. Similar intrashelf control data paths (not shown in FIG. 6) exist between control card B and ICON cards A 310a and B 310*b*. For clarity, they are not shown here. However, in the discussion below, it will be understood that the description of the operation of control card A applies to control card B as well.

Each of intrashelf paths 670 and 675 and CSL links 370*c* and 370*d* comprise three separate data channels: an RTS channel, an Ethernet channel, and a time sensitive data channel. Intrashelf path 670 includes an RTS channel 425, an Ethernet channel 425, and a direct multi-line channel 420. Intershelf CSL link 370*c* includes an RTS channel 480, an Ethernet channel 490, and a TDM/E1 channel 485. RTS channel 425 is connected through ICON A 310*a* to RTS channel 480, Ethernet channel 425 is connected to Ethernet channel 490, and multi-line channel 420 is connected to E1 channel 485.

Similarly, intrashelf path 675 includes RTS channel 660, Ethernet channel 655, and multi-line channel 650, while intershelf CSL link 370*d* includes RTS channel 630, Ethernet channel 620, and TDM/E1 channel 610. RTS channel 660 is connected through ICON B 310*b* to RTS channel 630, Ethernet channel 655 is connected to Ethernet channel 620, and multi-line channel 650 is connected to E1 channel 610.

In other embodiments, time sensitive data channels, for example, indirect multi-line channels, may be provided between a dual or quad fabric interface card (DFIC/QFIC) and each of control card A 300*a*, ICON card A 310*a*, and ICON card B 310*b*. Such channels may be provided in addition to, or in lieu of, direct multi-line channel 420 and multi-line channel 650.

The combination of intrashelf link 670 and intershelf link 370*c* forms a first threechannel communication path between control card A 300*a* and peripheral 1/0 shelf 110*c*. This first communication path will be referred to as communication path A. The combination of intrashelf link 675 and intershelf link 370*d* forms a second, independent three-channel communication path between control card A 300*a* and peripheral I/O shelf 110*c*. This second communication path will be referred to as communication path B. Control card A 300*a* is configured to allow it to individually address each of communication paths A and B.

A concept that is relevant to the embodiment of FIG. 6 is the "health" of a communication path or link. The health of a link refers to the ability of the link to carry traffic without data degradation or loss.

In the embodiment of FIG. 6, the health of communication paths A and B are continually monitored both by shelf controllers 350*a* and 350*b* on peripheral I/O shelf 110*c* and by control card A 300*a* on peripheral shelf 1 110*a*. The health of a link is determined by examining the data coming over each channel of the link to determine the amount of data loss or degradation. The relative health of a link is then determined according to preset criteria. Different weight may be assigned to the contribution by each channel to the overall health of a link. For example, in one embodiment, the state of the channel that carries the most critical and/or time-sensitive data (e.g., in the embodiment of FIG. 6, the TDM/E1 channel) carries the greatest weight, while the channel that carries the least critical data (e.g. in the embodiment of FIG. 6, the RTS channel), is given the least weight. In one embodiment that uses a three channel link like CSL links 370*c-d* of FIG. 6, the RTS channel is given no weight at all in calculating the overall health of the link—the health is determined solely based on the conditions of the TCM/E1 and Ethernet channels.

The relative health of two available communication paths or links between two endpoints (such as, for example, control card A 300*a* and peripheral I/O shelf 110*c* in FIG. 6) can be used to choose one of the two communication paths as a "nominal path" and the other as a "standby path." The nominal path may be used to transfer the normal data traffic between endpoints, while the "standby path" is kept available to carry the normal data traffic should the health of the "nominal path" deteriorate.

Various paradigms can be used for selection of the "nominal" and "standby" paths. In the embodiment of FIG. 6, the responsibility for selection of the "nominal" path is normally assigned to shelf controllers 350*a-b* of peripheral I/O shelf 110*c*, who communicate with each other over link 640, and who, together, can be considered to comprise a shelf control complex for peripheral I/O shelf 110*c*. Each of shelf controllers 350*a-b* monitors the health of the particular CSL link that it is connected to. That is, shelf controller A 350*a* monitors the health of CSL link 370*c* and shelf controller B 350*b* monitors the health of CSL link 370*d*. The shelf controllers negotiate among themselves based on the relative health of their respective CSL links to determine which link at any time is selected as the "nominal" link and which as the "standby" link. In addition, if a CSL link to a shelf controller deteriorates below a minimum threshold, the shelf controller may designate the link as being inoperative. Furthermore, in certain circumstances, for example if one of the links is being shut down for service, control card A may send a request to the shelf controllers to designate a particular link as the "nominal" link. However, in the embodiment of FIG. 6, the final decision rests with the shelf controllers.

The identity at any point in time of the "nominal" link constitutes critical, time sensitive information. For example, a control card such as control card A 330*a* uses the identity of the nominal link to determine which path to use for data traffic. In one embodiment, the data identifying the nominal link is simultaneously sent by both shelf controllers via the respective TDM/E1 channels of their respective CSL links to the control cards to ensure that the identity of the nominal link is known, preferably at all times, by the control cards. Sending data regarding the current nominal path via the TDM/E1 channels of both CSL links allows the control card to be instantly informed of a switch in the nominal link, even if the previous link, including its TDM/E1 channel is completely severed. The control card can instantly redirect the normal data traffic to the standby link with little to no loss of data. It should be noted that the normal data traffic is considered to be "path independent" between the endpoints (i.e. control card A 300*a* and peripheral I/O shelf 110*c*). That is, it does not matter whether communication path A or communication path B is used—all that matters is that the data is transferred between endpoints.

In the embodiment of FIG. 6, because TDM/E1 channels of CSL links 370*c* and 370*d* allow control card A to be instantly informed of a switch in the nominal link, it is not necessary, as in traditional APS schemes, for the normal data traffic over the Ethernet channel of the nominal link to be mirrored over the Ethernet channel of the standby link. As a result, the Ethernet channel of the standby link is available to carry additional data traffic. However, because the Ethernet channel of the standby link may at any time be called into use should a switch in the nominal link be commanded by the shelf controllers, such additional data traffic should normally constitute supplemental, non-critical data. Examples of such non-critical data include diagnostic data concerning the various elements and components in the standby path, and non-time critical software upgrades for elements and components in the standby path. Such data can be considered "path dependent" because it comprises data intended not for the endpoints, but for elements along a particular path.

Figure 7:
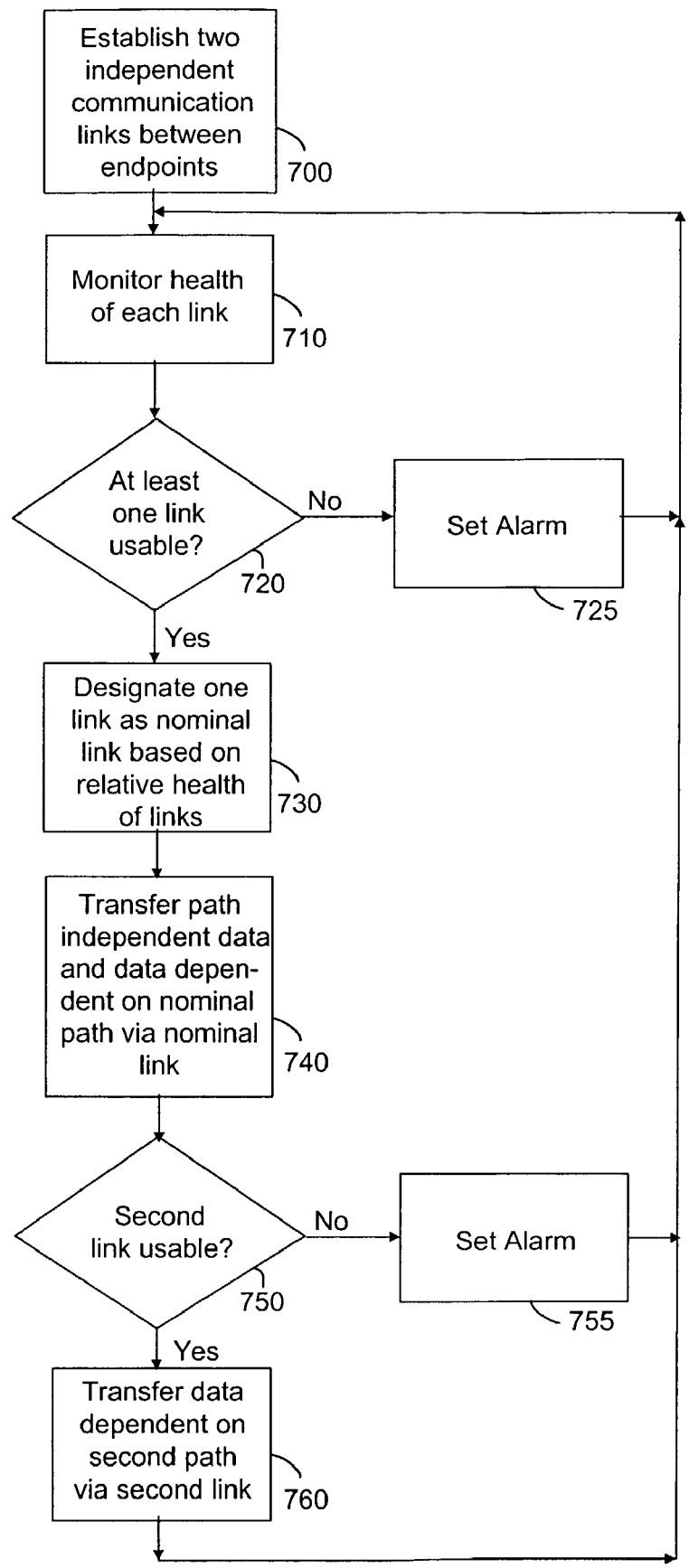
FIG. 7 is a flow chart showing a process used to optimize redundant link usage in an embodiment of the invention.

FIG. 7 is a flow chart showing a process used to optimize redundant link usage in an embodiment of the invention. Two independent communication links are established between endpoints at step 700 (e.g. a control complex and a peripheral or switching shelf or a card on a peripheral or switching shelf), and the health of each link is monitored at step 710. At step 720, a determination is made as to whether at least one link has sufficient health to be currently usable. If not, an alarm is set at 725 and the process returns to monitoring the health of the links at step 710.

If it is found at step 720 that at least one of the links is currently usable, then one usable link is designated as the nominal link based on the relative health of the links at step 730. At step 740, path independent data, and data dependent on the nominal path (i.e. the path formed by the link that has been designated as the nominal link) is transferred between endpoints via the nominal link. At step 750, a determination is made as to whether the second link is currently usable. If the second link is found to be not usable, an alarm is set at step 755 and the process returns to step 710. If the second link is found to be usable, then data dependent on the second path (i.e. the path formed by the second link) is transferred between endpoints via the second link. Thereafter the process returns to step 710.

Figure 8:
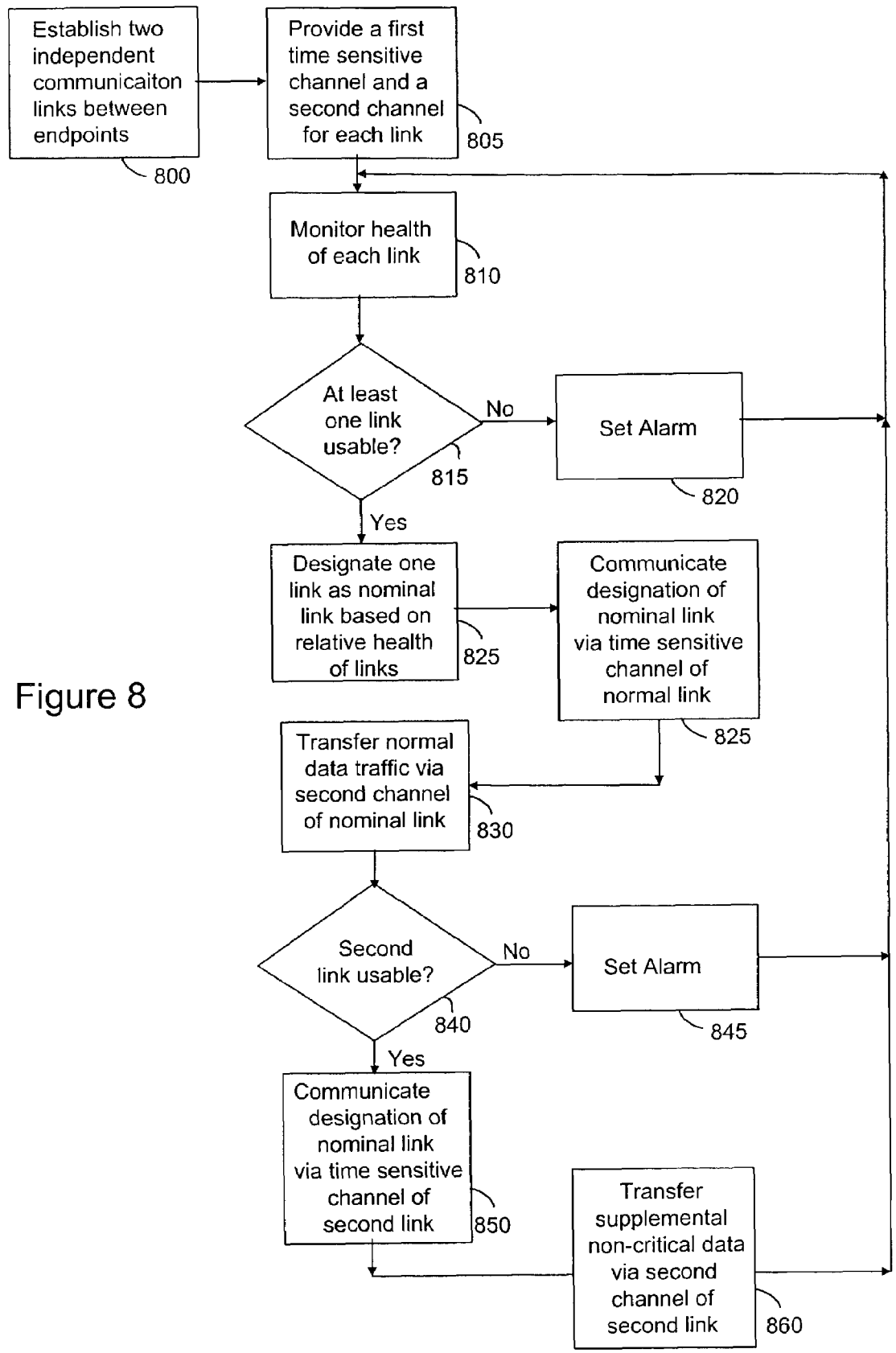
FIG. 8 is a flow chart showing a process used to optimize redundant link usage in an embodiment of the invention.

FIG. 8 is another flow chart showing a process used to optimize redundant link usage in an embodiment of the invention. Two independent links between endpoints are established at step 800. At step 805, each of the two channels are provided with a time sensitive channel (for example, the TDM/E1 channel of the embodiment of FIG. 6) and a second channel (for example the Ethernet channel of the embodiment of FIG. 6). The health of each link is monitored at step 810, which may include separately monitoring the health of each channel of each link. At step 815 a determination is made as to whether the health of at least one link is sufficient to be currently usable. If it is determined that no link is currently usable, an alarm is set at step 820 and the process resumes monitoring the health of the links at step 810.

If it is determined at step 815 that at least one link is currently usable, then one link is designated as the nominal link based on the relative health of the links at step 825. The designation of that link as the nominal link is communicated between endpoints via the time sensitive channel of the nominal link at step 830, and normal data traffic is transferred between endpoints via the second channel of the nominal link at step 835.

At step 840, a determination is made as to whether the health of the second link is sufficient to render it currently usable. If the second link is not found to be usable, an alarm is set at step 845 and the process returns to monitoring the health of the links at step 810. If the second link is found to be usable, the designation of the nominal link (which is sent via the time sensitive channel of the nominal link at step 830) is also sent via the time sensitive channel of the second link at step 850. In addition, supplemental, non-critical traffic is transferred between endpoints via the second channel of the second link at step 860. Thereafter the process returns to step 810.

Thus, a method and apparatus of optimizing redundant link usage in a multi-shelf network element has been presented. Although the invention has been described using certain specific examples, it will be apparent to those skilled in the art that the invention is not limited to these few examples. For example, although the invention has been described with respect to use in a multi-shelf network element, the invention may be used for optimization of redundant link usage within and between other communicating devices. Other embodiments utilizing the inventive features of the invention will be apparent to those skilled in the art, and are encompassed herein.

The invention claimed is:

1. A method for transferring data between endpoints in a communications system comprising the steps of:
   establishing at least two independent communications links between said endpoints;
   monitoring a health of each of said links;
   transferring path independent data between said endpoints via a first link;
   transferring data dependent on a first path formed by said first link via said first link;
   transferring data dependent on a second path formed by a second of said links via said second link.

2. The method of claim 1 wherein said data dependent on said first path comprises diagnostic data for said first path.

3. The method of claim 2 wherein said data dependent on said second path comprises diagnostic data for said second path.

4. The method of claim 1 wherein said first path comprises a plurality of first communications elements and wherein said data dependant on said first path comprises data whose destination is at least one of said first communications elements.

5. The method of claim 1 wherein said second path comprises a plurality of second communications elements and wherein said data dependant on said second path comprises data whose destination is at least one of said second communications elements.

6. The method of claim 1 wherein said first path comprises a plurality of first communications elements and wherein said data dependant on said first path comprises data whose origin is at least one of said first communications elements.

7. The method of claim 1 wherein said second path comprises a plurality of second communications elements and wherein said data dependant on said second path comprises data whose origin is at least one of said second communications elements.

8. The method of claim 1 further comprising the step of selecting said first link based on said health of said links.

9. The method of claim 1 wherein said data dependent on said first path comprises data different from said data dependent on said second path.

10. A method for transferring data between endpoints of a communications system comprising the steps of:
    establishing at least two independent communications links between said endpoints;
    providing a time sensitive communications channel and a second communications channel for each of said links;
    monitoring a health of each of said links;
    transferring data identifying a first of said links as a nominal link between said endpoints via said time sensitive channel of said first link and via said time sensitive channel of said second link;
    transferring normal data between said endpoints via said second channel of said first link;
    transferring supplemental data between said endpoints via said second channel of said second link.

11. The method of claim 10 wherein said time sensitive channel comprises a point-to-point communications protocol.

12. The method of claim 10 wherein said time sensitive channel comprises a time division multiplexed channel.

13. The method of claim 10 further comprising the step of selecting said nominal link based on said health of said links.

14. The method of claim 10 wherein said normal data comprises path independent data.

15. The method of claim 14 wherein said supplemental data comprises data dependent on a second path formed by said second link.

16. The method of claim 14 further comprising the step of transferring data dependent on a first path formed by said first link via said time sensitive channel of said first link.

17. The method of claim 16 further comprising the step of transferring data dependent on said second path via said time sensitive channel of said second link.

18. The method of claim 17 wherein said data dependent on said first path comprises data different from said data dependent on said second path.

19. The method of claim 14 further comprising the step of transferring data dependent on a first path formed by said first link via said second channel of said first link.

20. The method of claim 10 further comprising the steps of:
providing a third channel for each of said links;
transferring a time signal via said third channel of said first link.

21. The method of claim 20 further comprising the step of transferring a time signal via said third channel of said second link.

22. A multi-shelf network element comprising:
a first shelf comprising a control complex;
second shelf comprising first and second shelf controllers;
a first communications link between said control complex and said first shelf controller, said first communications link comprising a first data flow independent of any path between said control complex and said second shelf and a second data flow dependent on a first path between said control complex and said second shelf formed by said first communications link;
a second communications link independent of said first communications link between said control complex and said second shelf controller; said second communications link comprising a third data flow dependent on a second path between said control complex and said second shelf formed by said second communications link.

23. The multi-shelf network element of claim 22 wherein said second data flow comprises diagnostic data for said first path.

24. The multi-shelf network element of claim 23 wherein said third data flow comprises diagnostic data for said second path.

25. The multi-shelf network element of claim 22 wherein said first path comprises a plurality of first communications elements and wherein said second data flow comprises data whose destination is at least one of said first communications means.

26. The multi-shelf network element of claim 25 wherein said second path comprises a plurality of second communications elements and wherein said third data flow comprises data whose destination is at least one of said second communications means.

27. The multi-shelf network element of claim 22 wherein said first path comprises a plurality of first communications elements and wherein said second data flow comprises data whose origin is at least one of said first communications means.

28. The multi-shelf network element of claim 27 wherein said second path comprises a plurality of second communications elements and wherein said third data flow comprises data whose origin is at least one of said second communications means.

29. The multi-shelf network element of claim 22 wherein said second data flow comprises data different from said third data flow.

30. The multi-shelf network element of claim 22 wherein said control complex comprises first and second network element controllers.

31. A multi-shelf network element comprising:
a first shelf comprising a control complex;
second shelf comprising first and second shelf controllers;
first and second independent communications links between said control complex and said first shelf, said first and second communications links each comprising a time sensitive communications channel and a second channel;
said time sensitive communications channel of said first link comprising a first data flow comprising data identifying said first link as a nominal link;
said time sensitive communications channel of said second link comprising a second data flow comprising data identifying said first link as the nominal link;
said second channel of said first link comprising a third data flow comprising normal data;
said second channel of said second link comprising a fourth data flow comprising supplemental data.

32. The multi-shelf network element of claim 31 wherein said time sensitive channel comprises a point-to-point communications protocol.

33. The multi-shelf network element of claim 31 wherein said time sensitive channel comprises a time division multiplexed channel.

34. The multi-shelf network element of claim 31 wherein said third data flow comprises data that does not depend on any path between said control complex and said second shelf.

35. The multi-shelf network element of claim 34 wherein said fourth data flow comprises data dependent on a second path formed by said second link.

36. The multi-shelf network element of claim 34 wherein said first data flow comprises data dependent on a first path formed by said first link.

37. The multi-shelf network element of claim 36 wherein said second data flow comprises data dependent on said second path.

38. The multi-shelf network element of claim 37 wherein said first data flow comprises data different from said second data flow.

39. The multi-shelf network element of claim 34 wherein said third data flow comprises data dependent on a first path formed by said first link.

40. The multi-shelf network element of claim 31 wherein each of said first and second links each comprise a third channel, said third channel of said first link comprising a fifth data flow comprising a time signal.

41. The multi-shelf network element of claim 40 wherein said third channel of said second link comprises a sixth data flow comprising a time signal.

* * * * *